April 30, 1935.  A. M. ERICKSON  1,999,449
FRUIT AND VEGETABLE CUTTING DEVICE
Filed March 22, 1932  3 Sheets-Sheet 1

INVENTOR.
ARVID M. ERICKSON.
BY Jas. M. Naylor
ATTORNEY.

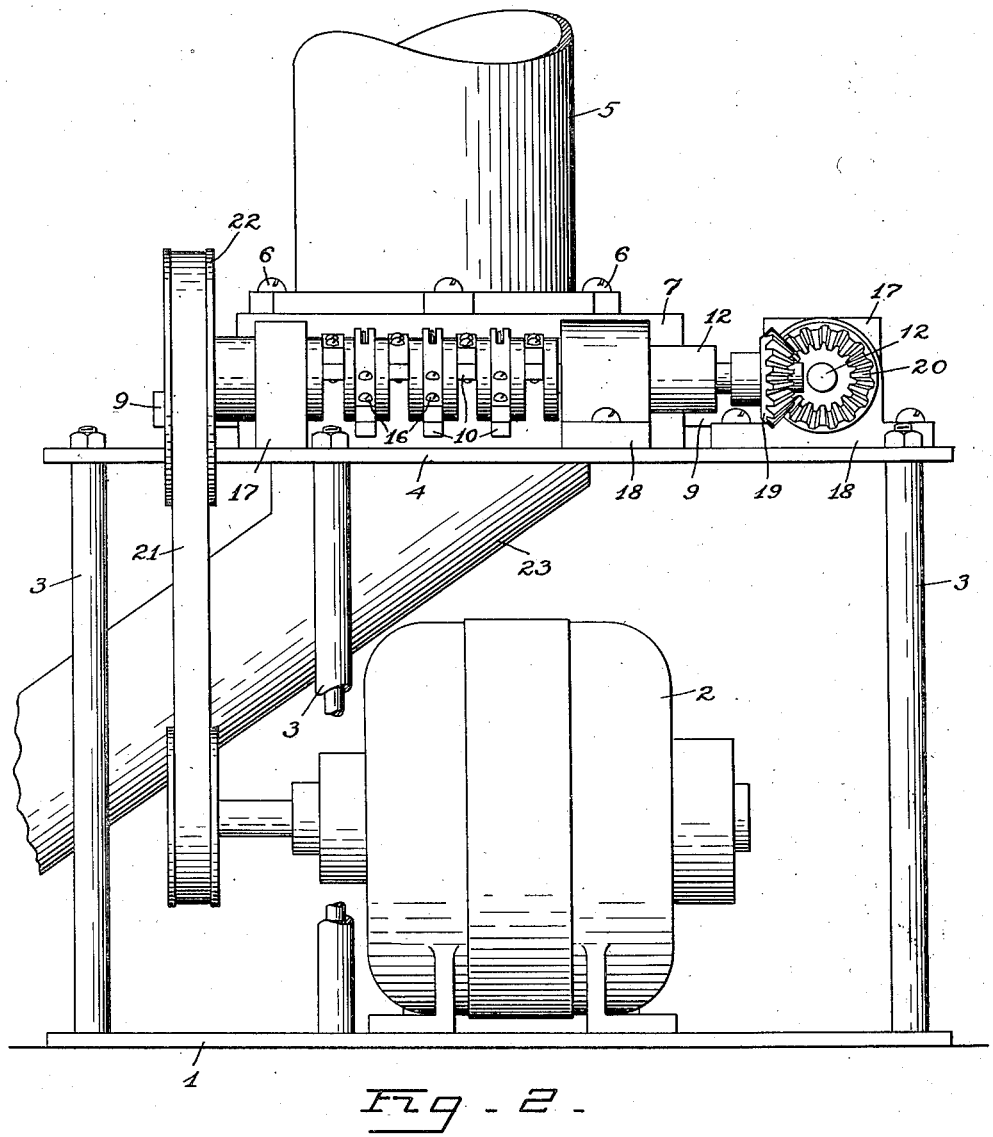
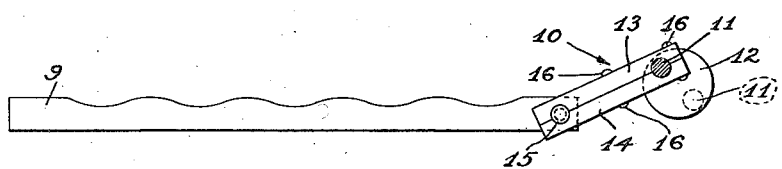

April 30, 1935.   A. M. ERICKSON   1,999,449
FRUIT AND VEGETABLE CUTTING DEVICE
Filed March 22, 1932   3 Sheets-Sheet 3

INVENTOR.
ARVID M. ERICKSON
BY Jas. M. Naylor
ATTORNEY

Patented Apr. 30, 1935

1,999,449

UNITED STATES PATENT OFFICE 1,999,449

FRUIT AND VEGETABLE CUTTING DEVICE

Arvid M. Erickson, San Jose, Calif., assignor to Barron Gray Packing Company, San Jose, Calif., a corporation of California Application March 22, 1932, Serial No. 600,408

2 Claims. (Cl. 146—78)

This invention relates to a device for cutting fruits, vegetables and the like, particularly of that type which reduce the material into symmetrical segments.

It is a well known fact to those familiar with the art that fruits and vegetables, and particularly those which have been canned, designed for use in fruit salads and soups, respectively, should not only be palatable but attractive in appearance since the latter contributes considerably to the saleability of the article. Heretofore, the operation of cutting the fruits and vegetables has been performed by comparatively complex and crude machinery with the resulting great waste of time, labor and material.

The object of my invention is to provide a device for cutting fruits, vegetables or the like into blocks of regular geometrical configurations.

Another object of my invention is to provide an automatic device for cutting fruits, vegetables or the like, which employs a number of reciprocating knives arranged in rows superimposed one above the other, by means of which said fruits, vegetables or the like are cut into the desired shapes.

Another object of my invention is to provide an automatic device for cutting fruits, vegetables or the like, which may be equally well adapted for use in connection with a gravity or forced feed system.

Another object of my invention is to provide an automatic device for cutting fruits, vegetables or the like into long strips, the cross-sections of which will represent some regular geometrical figure, as, for example, a square, equilateral triangle, etcetera.

A further object of my invention is to provide a device of the type described which is compact, extremely simple in construction, durable and efficient for the purpose intended.

Other objects and advantages will appear as the specification proceeds and the novel features of the device will be particularly pointed out in the claims hereunto annexed.

The preferred form of my invention is illustrated in the accompanying drawings in which:

Figure 2 is a side elevation of the invention,

Figure 3 is a fragmentary view showing one of the individual cutting knives in my device and the means of attaching same to a driving mechanism.

Figure 1:
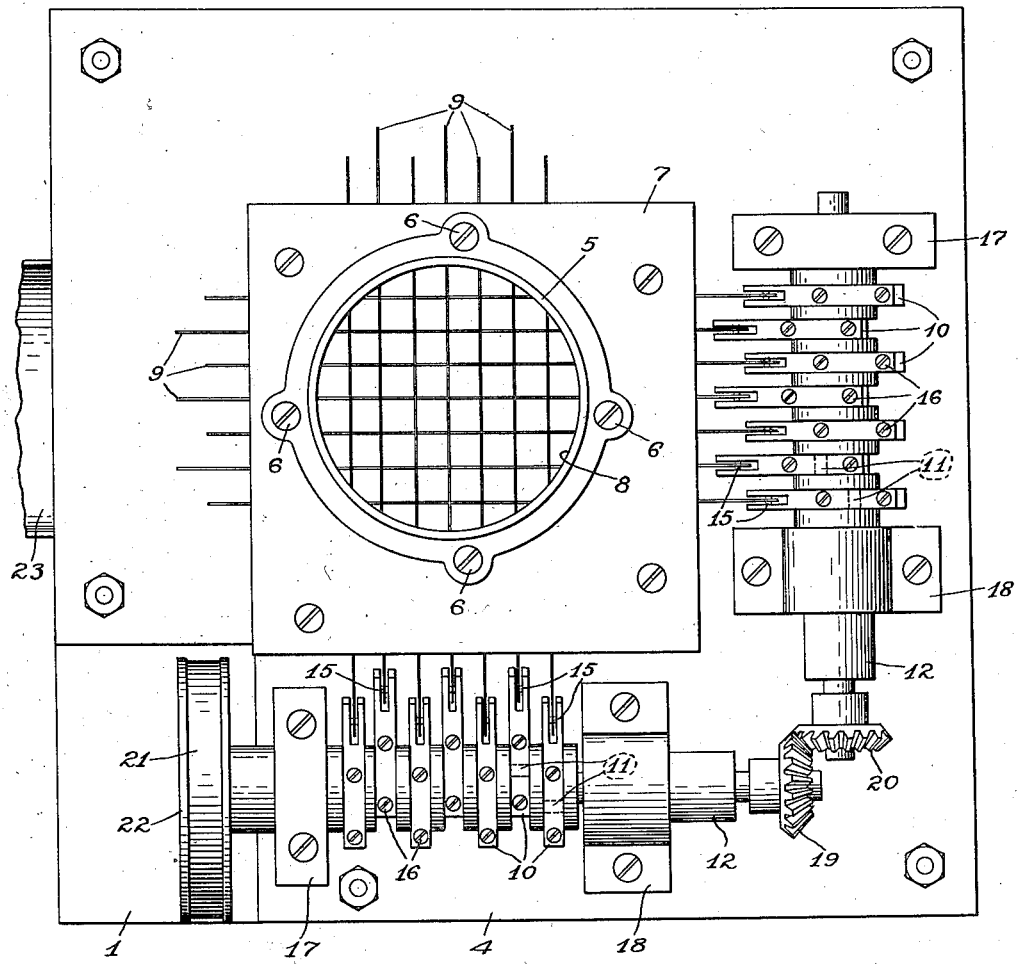
Figure 1 is a plan view of my cutting device.

In carrying out my invention I provide a base 1 carrying an electric motor 2 which serves as a motive power for the hereinafter described mechanism, and a number of uprights 3, supporting in their turn a platform 4 on which a cutting mechanism is disposed.

The latter consists of a hopper 5 which is shown as being of a cylindrical shape, but may be of any shape depending upon the type of material to be cut.

The hopper 5 is attached by means of screws 6 to a block 7 which has an aperture 8 of the same size and shape as said hopper, shown, in this instance, as being round, and disposed thereunderneath.

The block 7 is rigidly attached to the platform 4 and has two series of narrow openings 8 (see Figure 5) superimposed one above the other and being at right angles one to the other. The openings are spaced equi-distant from each other throughout both series. Said openings 8 serve as a guiding means for cutting knives 9, presently to be described.

Each of the knives 9 comprise a thin steel blade of the shape plainly shown in Figure 3, and of sufficient length to project through the block, and has its upper edge sharpened. Each of the knives 9 is connected to the driving mechanism by means of a connecting link 10, one end of which is pivotally attached to said knife and the other is mounted on the crank 11 of the crankshaft 12. The structure of the link 10 can be best seen in Figure 3 and is shown as consisting of top and bottom pieces 13 and 14 respectively, firmly embracing the pivot 15 of the knife 9 and the crank 11 of the crankshaft 12, and as being securely held together by screws 16.

In Figure 1 I show my device as having two crankshafts 12, each of them being supported by suitable bearings 17 and 18 and carrying rigidly attached beveled gears 19 and 20. The motor 2 rotates both crankshafts by means of a belt 21 and a pulley 22 rigidly connected to the end of one of the crankshafts 12.

Each of the crankshafts operates a series of knives 9 and imparts a reciprocating motion thereto in such a manner as to move one knife forwardly while the knife adjacent to it moves rearwardly. This is accomplished by forming the adjacent cranks 11 diametrically opposite, as illustrated in Figure 3.

The cut material drops into a discharge chute 23 disposed under the platform 4 and attached thereto.

From the foregoing description the operation of the device is readily understood.

The material to be cut is placed into the hopper 5 and forced either by gravity or by suitable mechanism onto the high speed (due to relative shortness of stroke) reciprocating knives of the first series and is cut longitudinally. Due to the fact that alternate knives in each series move in one direction and the rest in the opposite direction, no shift is affected in the position of the material during this first cutting step, and thus the cut pieces meet the lower series of knives in proper alignment to receive a true transverse cut.

The lower series of knives, being arranged and operated in the identical manner as the upper series, will complete the cutting operation without causing shifting of the longitudinally cut pieces as they pass therethrough. As a result of this combined cutting I receive pieces which are consistently square in cross-section.

The type of the device so far described is particularly well adapted for cutting canned pineapple for fruit salads. As is well known, canned pineapple is cut in round slices of uniform thickness; hence when the contents of cans of such fruit are dumped into the hopper 5, and are forced by their own weight against the reciprocating knives, the latter cut the slices into dice of uniform size, with but a negligible amount of waste. This operation is fully automatic and continuous during which the device does not require any attention or service, save the loading of the hopper, which operation may also be easily made automatic.

Figure 4:
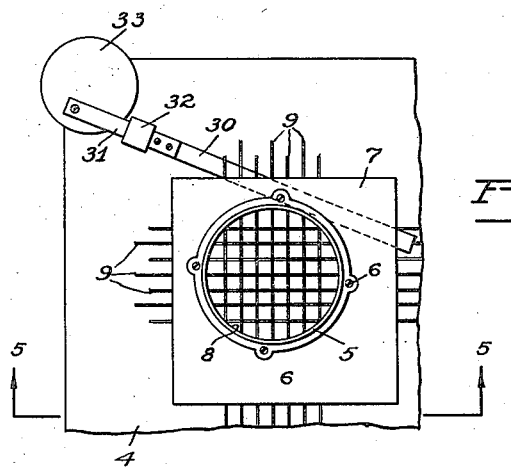
Figure 4 is a plan view of the device as illustrated in Figure 1 showing as a modification the addition of a second type of slicing knife.
Figure 5:
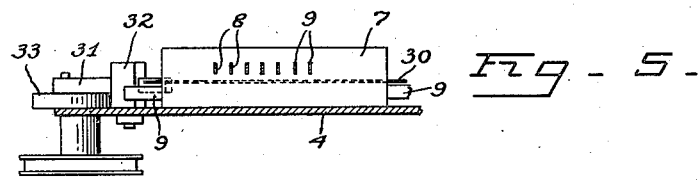
Figure 5 is a section taken along the line 5—5 of Figure 4.

In Figures 4 and 5 I show a modified form of my invention, the novel feature being an additional horizontal knife 30 disposed and adapted to move in a slot in the block 7. The knife 30 is attached to a rod 31 which is slidably received by a guide 32 which in turn is rotatably attached to the platform 4. The other end of the rod 31 is pivotally and excentrically affixed to the rotatable member 33. Any means may be employed to impart rotation to the latter.

When the member 33 is rotated, a double motion is imparted to the knife 30 as a result of combined movement of said member 33 and the rotatable guide 32, the motion of the knife being, simultaneously, swinging and reciprocating.

Thus the knife 30 may be aptly termed a cubing knife, in that it determines the length of the strips cut vertically by the knives 9.

Figure 6:
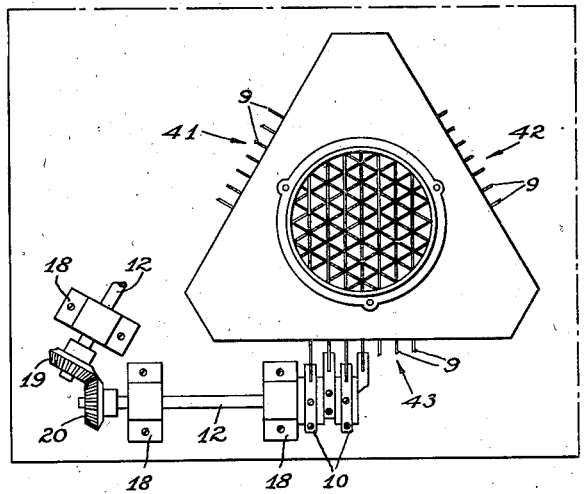
Figure 6 illustrates a second modification of my invention showing an arrangement of the reciprocating knives illustrated in Figure 1 which will permit the cutting of the material into triangular shaped segments.

The knives 9 may be arranged into more than two series and disposed at different angles so as to reproduce pieces having a shape other than square in cross-section. Figure 6 shows an arrangement where three series are employed, 41, 42 and 43, respectively, and the final pieces will be of regular triangular shape.

In this arrangement it will be noted that a triangular shaped block is substituted for the square block shown in Figure 1 in the slots on which the reciprocating knives are disposed. Instead of the criss-cross reciprocating knives shown in Figure 1 I provide three sets of the identical knives disposed in slots provided on the three walls of the triangular block. The mounting of the eccentric crankshaft with beveled gears is identical with that shown in Figure 1 with the exception that an additional shaft is provided to drive the third set of knives.

In connection with the modification shown in Figure 6 it is also to be appreciated that the swinging reciprocal knife 30 provided in the modification shown in Figure 4, and designed to cut the fruit into predetermined lengths by making a horizontal swipe therethrough, may be employed. It can be disposed in the triangular block between either set of the reciprocating knives in the same manner as shown in Figure 5.

Although I have shown and described one form and two modifications of my invention, it should be understood that various changes and other modifications may be made within the scope of the annexed claims without departing from the spirit of the invention.

Having thus described my invention, what I claim is:

1. A cutting device for fruits and the like comprising a block rigidly supported by a base, an aperture extending through said block and said base, a horizontally disposed slot in said block bisecting the aperture therein, a knife slidably received by said slot extending across said aperture, said knife being attached by one of its ends to a rod slidably received by a guide rotatably attached to said base, the opposing end of said rod being pivotally and eccentrically connected to a rotatable member mounted on said base, and a driver for said rotatable member.

2. A cutting device for fruits and the like comprising a block rigidly supported by a base, an aperture extending through said block and said base, a horizontally disposed slot in said block bisecting the aperture therein, a cutter slidably received by said slot extending across said aperture, said cutter being attached by one of its ends to a rod slidably received by a guide attached to said base, the opposing end of said rod being pivotally and eccentrically connected to a rotatable member mounted on said base, and a driver for said rotatable member.

ARVID M. ERICKSON.